Patented June 9, 1942

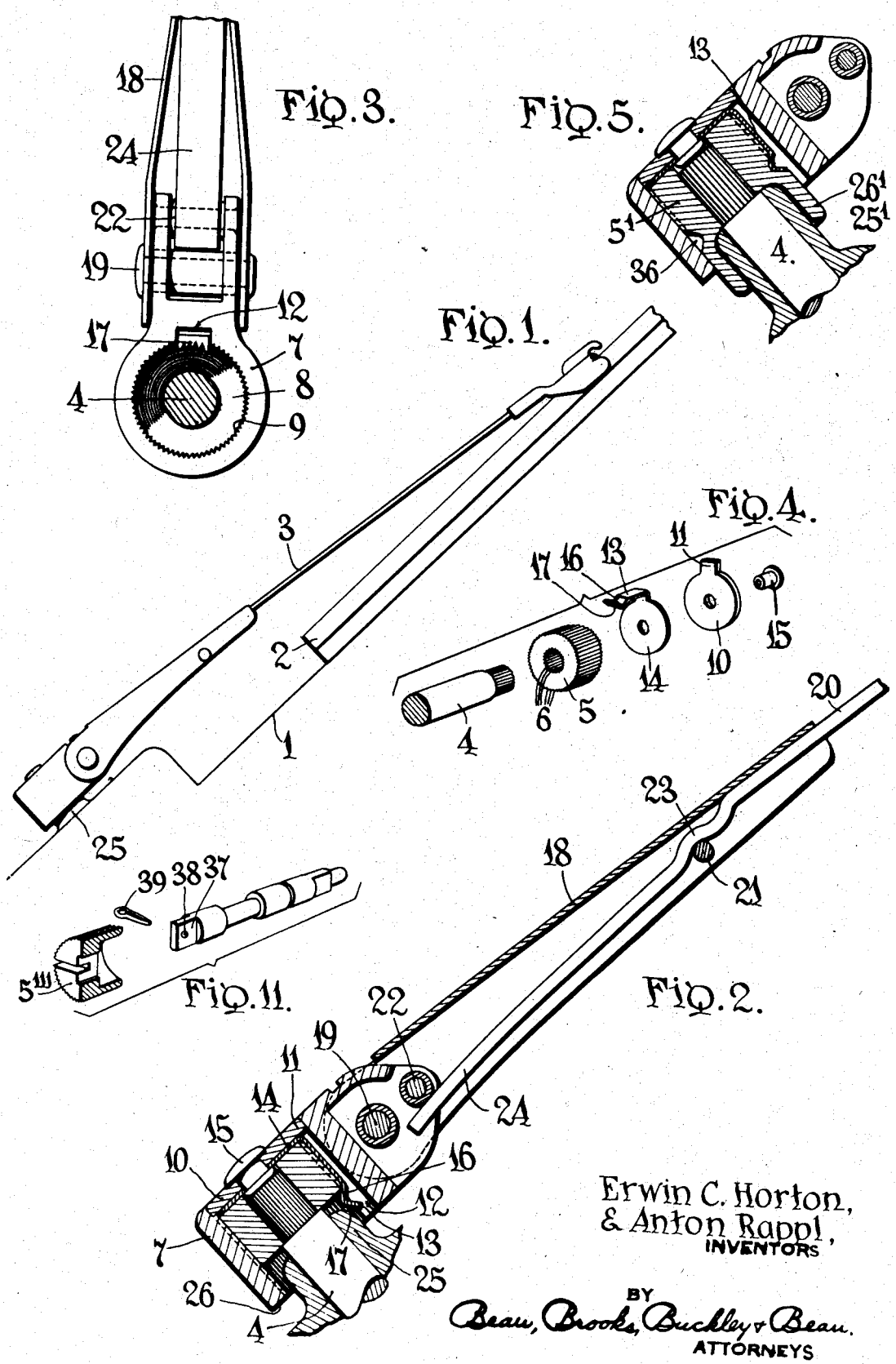

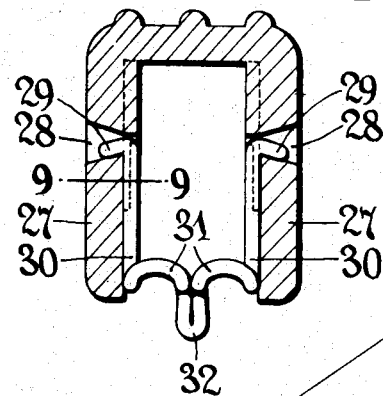
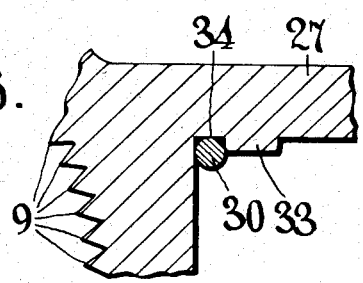
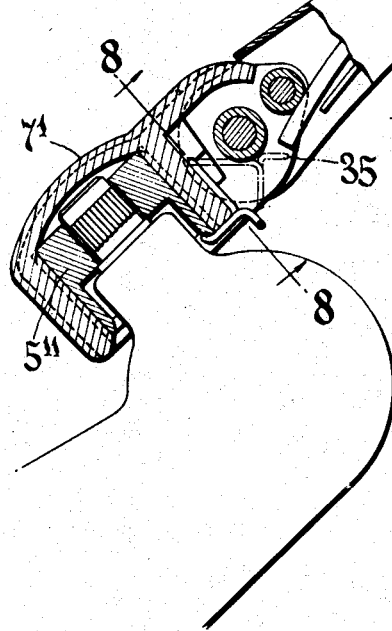
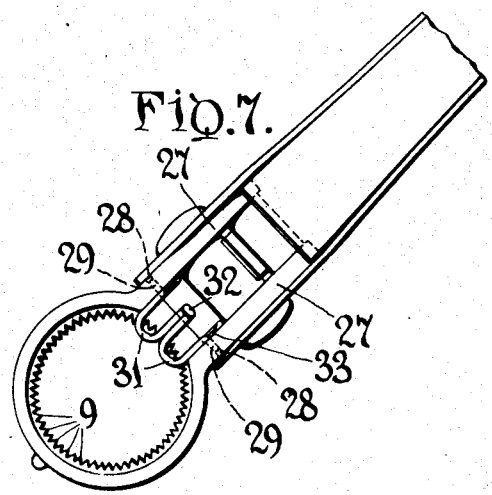
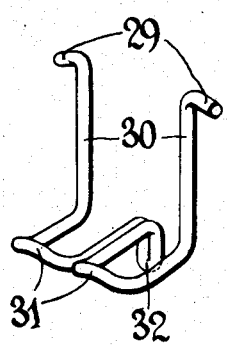

2,286,035

UNITED STATES PATENT OFFICE 2,286,035

WINDSHIELD CLEANER

Erwin C. Horton, Hamburg, and Anton Rappl, Buffalo, N. Y., assignors to Trico Products Corporation, Buffalo, N. Y.

Application April 25, 1940, Serial No. 331,628

10 Claims. (Cl. 287—52.02)

This invention relates to a windshield cleaner and more particularly to the wiper carrying arm and its mode of attachment to its actuating shaft. More particularly, the invention relates to an improved mounting for the arm which permits the stroke of the wiper being arranged to better advantage with respect to the driver of the vehicle.

The present invention has for its object to provide an arm mounting by which the path of the carried wiper may be shifted for greater visibility through the windshield. More specifically, this flexibility in the arm mounting is effectively accomplished by a novel construction which enables the arm to be adjusted readily on its actuating shaft and at the same time provide a firm driving connection.

The invention further resides in an improved arm construction by which the parts may be economically manufactured in a practical manner and when assembled will be protected from the weather.

In the drawings, which depict one embodiment of the invention:

Fig. 1 is a side elevation of a portion of the improved windshield cleaner;

Fig. 2 is an enlarged sectional view more clearly illustrating the construction;

Fig. 3 is a rear elevation of the shaft attaching end of the arm;

Fig. 4 is an exploded perspective view showing parts forming the arm and shaft connection;

Fig. 5 is a view similar to Fig. 2 showing a modified embodiment of the invention;

Fig. 6 shows a further modification exemplifying the present invention;

Fig. 7 is an inside plan view of the shaft end of the arm shown in Fig. 6;

Fig. 8 is a transverse sectional view through the arm about on line 8—8 of Fig. 6;

Fig. 9 is a fragmentary sectional view about on line 9—9 of Fig. 8;

Fig. 10 is a detailed perspective view of the keeper utilized in this modification; and Fig. 11 is an exploded perspective view of a still further modification.

Referring more particularly to the drawings, the numeral 1 designates diagrammatically the windshield of a motor vehicle over the surface of which is oscillated the wiper 2 by and under the resilient urge of the spring arm.

When the windshield cleaner is installed on the motor vehicle, attention must be given to the location of the path of movement of the wiper to secure the greatest visibility and also to avoid the wiper's striking against the windshield frame during operation. According to the present invention the arm is connected to its actuating shaft 4 for ready adjustment about its axis. According to the present showing this is accomplished by providing the actuating shaft with a substantially fluted head. The head is preferably enlarged to obtain finer adjustment as well as to secure a firm driving connection between the shaft and arm. To this end an annular key member 5 is provided, the inner and outer peripheries of which are adjustably interlocked with the shaft and arm, respectively, and for this purpose both peripheries are fluted, the grooves of the fluting being V-shaped and defining fine ribs or teeth 6 which extend substantially parallel to the axis of the ring-like key and shaft. Preferably the fluted head 5 is permanently fixed to the shaft, in which event the head may be secured otherwise in place on the shaft.

The inner section 7 of the arm has a cylindrical socket or recess 8 with its side wall serrated at 9 to interfit and interlock with the outer ribs 6 on the fluted head 5. This provides a selectivity of adjustment sufficient to secure the best location for the arm on the shaft. Furthermore, by this simple interlocking fit a minimum amount of play is present between the arm and its driving shaft because the diameter of the head is relatively large and consequently the periphery may be divided into a multitude of fine V-shaped ribs which afford a firm anchorage for the arm. By simply sliding the arm section 7 axially on the head the arm will interlock itself to the shaft.

The socketed arm section may be cast in one piece, as depicted in Fig. 6, or the socket may extend entirely through the part 7, as shown in Fig. 2, wherein the outer end is counterbored to receive a bottom closure plate 10 held from turning by a radial lug 11 fitting a groove 12 in the wall of the bore.

The interlock between the arm and its shaft is maintained by a detachable connector which is herein depicted in the form of a spring latch 13 having an anchoring disc 14 secured to the closure plate 10, as by the rivet 15. This disposes the anchoring disc at the closed end of the socket in a concealed position with the latch 13 extending outwardly through the groove 12. The latch and its anchoring disc are shown stamped from one piece, and the outer free end of the latch is angularly deflected to form a keeper 16 which overhangs the rear face of the fluted head to secure the arm on the shaft. This keeper may also be provided with fine ribs, as shown in Fig. 3, to interengage with the corresponding parts on the head when the arm is being slid into position, and in order to facilitate this placement the keeper is formed with a beveled nose 17. To remove the arm the nose may be engaged by a tool and lifted to release the head.

It will be noted that the socket conceals the latch 13 as well as overhangs the supporting bearing or sleeve 25 for the shaft 4, providing in effect a weather skirt, as at 26, to deflect the rain away from the shaft bearing. This weather skirt may be carried by the key 5', as shown at 26' in Fig. 5 to overlap the bearing sleeve 25', in which construction the key will be provided with an annular groove 36 to receive the latch.

Figs. 6 through 10 illustrate a further embodiment of the present invention wherein the inner section 7' has a modified anchorage for the latch. In this form of the invention the latch is mounted exteriorly of the socket between the side walls 27 of the inner arm section 7. The side walls are provided with outwardly flaring holes 28 in which the trunnions 29 of the spring wire constructed latch pivot. The trunnions may incline, as shown, to engage more securely in the holes against too easily becoming dislodged. The latch has parallel legs 30 and at their outer ends a pair of keeper parts 31 for overhanging the wall of the socket and engaging behind the weather skirt of the fluted head 5''. The parts 31 are turned inwardly to hook over the edge of the skirt and thereby tend to more effectively secure the arm on the shaft. A handle 32 is provided on the latch by which the keeper parts 31 may be disengaged from the key to permit removal of the arm. The latch is held in its operative position by shoulders or ribs 33 which define pockets 34 into which the legs 30 may spring when moved to their operative position. When it is desired to remove the arm the handle 32 is lifted to an unlatching position generally at 35 in Fig. 6. During this movement the legs 30 will cam upon the overhanging ribs 33 and finally rest thereon in the unlatched position. The latch is concealed within the arm section but may have its handle projected as shown, if desired.

The inner section in all forms of the invention may be readily formed by simple die casting operations so as to give a firm substantial anchorage for the arm upon the shaft. By reason of this rugged construction the minute ribs 9 will firmly interengage a like number of ribs 6 on the fluted head to obtain the selected position. The cylindrical contour of the interfitting socket and key affords maximum strength while still permitting ready selective adjustment of the arm on the shaft.

In some installations it is desirable to have the fluted head removable in order to facilitate the mounting of the actuating shaft. For example, where the shaft is projected through a small opening in the cowl, the size of the opening may be kept more nearly that of the shaft if the head is first removed and then replaced subsequent to the placement of the shaft. This is exemplified in Fig. 11 wherein the shaft has a non-circular end 37 provided with a transverse hole 38 to receive a cotter pin 39 after first mounting the fluted head 5''.

In the illustrated embodiment of Fig. 2 the arm comprises an inner section formed by the part 7 and an outer section to which the wiper is connected and which is pivotally connected to said inner section by pivot pin 19. The outer section is composed of a channeled sheet metal stamping 18 and a leaf spring part 20 which telescopically fits the stamping 18. This spring part passes beneath a keeper pin 21 and has its free inner end 24 resting on a bearing 22, carried by the inner section 7. Where it passes beneath the pin 21, said spring part is formed with a seat 23 to receive such pin and interlock the two parts 18 and 20 together into a unitary outer arm section. The spring leaf extension 24 not only yieldably resists outward swinging of the arm section but also serves to hold the wiper under proper pressure during its wiping action.

From the foregoing it will be observed that the arm has a wide range of mountings to enable proper location of the wiper and its path of movement on the windshield. The fluted head may be hardened steel and its sliding interfit with the fluted socket wall provides a nicety of adjustment which permits the wiper path being shifted to the best position. The latch may be completely housed and concealed when the arm is in position on its shaft and yet be accessible for effecting detachment of the arm from the shaft for repair or for changing the path of the wiper. The arrangement is such that the parts are well protected from the weather.

The foregoing detailed description has been given merely to exemplify the teachings of the present invention which obviously are applicable to other physical embodiments without departing from the inventive spirit or scope now claimed.

What is claimed is:

1. A windshield wiper arm having a shaft receiving socket with a pair of side walls extending outwardly therefrom, the walls having opposed recesses, a shaft engaging latch formed of wire to provide a shaft engaging keeper part and a pair of trunnions, the latter pivoting in the recesses, and means for retaining the latch operative.

2. A windshield wiper arm for attachment to a shaft mounted in a bearing with a sleeve extension about the shaft, comprising a key part adapted for being carried by the shaft for movement therewith, a wiper arm having a socket detachably receiving the key part, and means detachably connecting the arm and key part, there being a weather skirt carried by the key part and extending in overlapping relation with the sleeve extension.

3. A windshield cleaner having a shaft mounted in a bearing with a sleeve extension about the shaft, a key part carried by the shaft for movement therewith, a wiper arm having a socket detachably receiving the key part, and means detachably connecting the arm and key part, there being a weather skirt carried by the key part, the key part having a peripheral groove to interlockingly receive the connecting means.

4. A windshield wiper arm having a shaft receiving socket with a pair of side walls extending outwardly therefrom, the walls having opposed recesses, a shaft engaging latch having oppositely extending trunnions engaged in the recesses, the latch also having a keeper part movable to a position overhanging the socket wall to engage a shoulder on an associated shaft.

5. A windshield wiper arm having a shaft receiving socket with a pair of side walls extending outwardly therefrom, the walls having oppositely flaring opposed recesses, a shaft engaging latch formed of wire to provide a shaft engaging keeper part and a pair of trunnions, the latter pivoting in the recesses and being deflected to engage upon the flaring walls thereof, and means for retaining the latch operative.

6. A windshield wiper arm having a shaft receiving socket with a pair of side walls extending outwardly therefrom, the walls having opposed recesses, a shaft engaging latch having oppositely extending trunnions engaged in the recesses, the latch also having a keeper part movable to a position overhanging the socket wall and shaped to conformably engage an undercut shoulder on an associated shaft.

7. A windshield wiper arm having a shaft receiving socket with a pair of side walls extending outwardly therefrom, the walls having opposed recesses, a shaft engaging latch formed of wire to provide a shaft engaging keeper part and a pair of trunnions, the latter pivoting in the recesses, and means for retaining the latch operative, said retaining means being in the form of a shoulder on one of the walls for overhanging a trunnion carrying portion of the latch, such portion being yieldable to disengage the shoulder to render the keeper part inoperative.

8. A windshield cleaner comprising a wiper arm and an actuating shaft therefor, one element having a cylindrical socket wall formed with fine ribs slidably receiving interlockingly and selectively a mating formation on a cylindrical part on the other element, the ribs on the two elements being of a substantial length and closely interfitting against play, the connection between the arm and shaft permitting selective location of the path of the arm on an associated windshield, said arm having a radially extending outer section pivotally mounted and urged by a spring to provide pressure in the wiping contact of a carried wiper, such spring reacting during operation to cant the arm on the shaft and thereby provide a frictional binding securement between the interlocking ribs at opposite sides of the axis of rotation.

9. A windshield cleaner having an actuating shaft with an enlarged cylindrical head, a wiper arm having a cylindrical socket conformably receiving the head upon relative movement axially of the shaft, the peripherally contacting portions of the enlarged head and socket having a multiplicity of interengaging and closely interfitting ribs constituting a selective interlock between the arm and shaft, one of the contacting portions having a recess, and means concealed within the socket and movable in the recess for securing the interlock, said arm having a laterally extending wiper carrying part embodying resilient means reacting to cant the socket on the shaft for frictionally binding the interfitting ribs at opposite sides of the axis of rotation in assistance to the securing means.

10. A windshield cleaner having a bearing, an actuating shaft journaled therein and provided with a cylindrical head having its periphery formed with a multiplicity of fine ribs extending lengthwise of the shaft, a wiper arm having a cylindrical socket closed at its outer end and its inner side wall formed with mating projections interengaging with and sliding upon said ribs axially of the shaft to selectively interlock the arm to the shaft and effect a driving connection therebetween permitting small increments of arm adjustment about the shaft, the head being of greater diameter than the shaft and its bearing with the peripheral ribs being disposed radially outward of the bearing to afford a positive driving connection thereat with the arm whereby the cylindrically arranged interengaging ribs constitute the sole line of power transmission between the shaft and arm, said head being removable to permit mounting and demounting of the shaft, and means for holding the socket ribs against sliding lengthwise on the head ribs.

ERWIN C. HORTON.
ANTON RAPPL.